(12) United States Patent
Kawasaki et al.

(10) Patent No.: US 12,298,240 B2
(45) Date of Patent: May 13, 2025

(54) OPTICAL SYSTEM FOR MEASURING OPTICAL CHARACTERISTICS AND DEVICE FOR MEASURING OPTICAL CHARACTERISTICS

(71) Applicant: Konica Minolta, Inc., Tokyo (JP)

(72) Inventors: Takashi Kawasaki, Sakai (JP); Yoshitaka Teraoka, Suita (JP); Takushi Uda, Osaka (JP); Syogo Mochida, Osaka (JP); Kenji Konno, Sakai (JP)

(73) Assignee: Konica Minolta, Inc., Tokyo (JP)

( * ) Notice: Subject to any disclaimer, the term of this patent is extended or adjusted under 35 U.S.C. 154(b) by 206 days.

(21) Appl. No.: 18/013,439

(22) PCT Filed: May 13, 2021

(86) PCT No.: PCT/JP2021/018221
§ 371 (c)(1),
(2) Date: Dec. 28, 2022

(87) PCT Pub. No.: WO2022/004147
PCT Pub. Date: Jan. 6, 2022

(65) Prior Publication Data
US 2023/0288330 A1  Sep. 14, 2023

(30) Foreign Application Priority Data
Jul. 2, 2020 (JP) .................... 2020-114925

(51) Int. Cl.
*G01N 21/47* (2006.01)
(52) U.S. Cl.
CPC ..... *G01N 21/47* (2013.01); *G01N 2021/4711* (2013.01)

(58) Field of Classification Search
CPC ...... G02B 21/18; G02B 21/02; G02B 27/108; G02B 13/24; G01N 21/47; G01N 2021/575; G01N 2021/4711; G01J 1/0242
See application file for complete search history.

(56) References Cited

U.S. PATENT DOCUMENTS

| | | | | |
|---|---|---|---|---|
| 6,208,473 B1 * | 3/2001 | Omura | ............... | G02B 17/0892 359/732 |
| 2004/0070742 A1 * | 4/2004 | Suenaga | ............... | G02B 13/24 359/650 |

(Continued)

FOREIGN PATENT DOCUMENTS

| | | |
|---|---|---|
| EP | 1657580 A1 | 5/2006 |
| WO | 2006/050978 A2 | 5/2006 |

OTHER PUBLICATIONS

Extended European Search Report (EESR) dated Nov. 28, 2023 issued in European Patent Application No. 21833381.3.

(Continued)

*Primary Examiner* — Sang H Nguyen
(74) *Attorney, Agent, or Firm* — RANKIN, HILL & CLARK LLP

(57) ABSTRACT

Provided are an optical system for measuring optical characteristics and a device for measuring optical characteristics capable of acquiring a two-dimensional image close to visual observation in addition to measurement of optical characteristics of a measurement target. The optical system for measuring optical characteristics includes a first optical system (11) that captures an infinite conjugate image and a second optical system (12) that captures a conjugate image of a measurement target. The first optical system (11) and the second optical system (12) sharing a first lens group (G1) are arranged on two optical axes separated by an optical element (5) that deflects an optical axis, respectively, and are configured as one measuring optical system. Furthermore, an (Continued)

aperture stop of the second optical system (12) is arranged in the vicinity of an intermediate image. When a distance in an optical axis direction from an image side paraxial focal point of the first lens group (G1) to the aperture stop is represented by Δp, and a focal distance of the first lens group is represented by f1, Δp/f1 satisfies −1.0<Δp/f1<3.0.

20 Claims, 8 Drawing Sheets

(56) References Cited

U.S. PATENT DOCUMENTS

| | | | | |
|---|---|---|---|---|
| 2006/0056067 | A1* | 3/2006 | Yanai | G02B 15/143507 |
| | | | | 359/754 |
| 2009/0115884 | A1* | 5/2009 | Matsusaka | G02B 15/143507 |
| | | | | 348/347 |
| 2013/0016278 | A1* | 1/2013 | Matsusaka | G02B 13/0045 |
| | | | | 359/713 |
| 2015/0234167 | A1* | 8/2015 | Ode | G02B 15/142 |
| | | | | 359/432 |
| 2016/0246038 | A1* | 8/2016 | Amano | G02B 13/16 |
| 2017/0153427 | A1* | 6/2017 | Masui | G02B 15/145131 |
| 2022/0400240 | A1* | 12/2022 | Fujikawa | G02B 27/141 |

OTHER PUBLICATIONS

International Search Report dated Aug. 3, 2021 filed in PCT/JP2021/018221.

* cited by examiner

OPTICAL SYSTEM FOR MEASURING OPTICAL CHARACTERISTICS AND DEVICE FOR MEASURING OPTICAL CHARACTERISTICS

TECHNICAL FIELD

The present invention relates to an optical system for measuring optical characteristics and a device for measuring optical characteristics.

BACKGROUND ART

Recently, in ICT products represented by smartphones or industrial products such as automobiles, coating techniques and decoration techniques have been developed due to the need for improvement in design. For example, coating techniques have been developed that exhibit complex reflection characteristics such that appearance varies depending on a viewing angle or a direction in which light is applied, such as metallic coating of an automobile exterior.

In a case of evaluating an appearance of a surface having such reflection characteristics, it is difficult to say that the appearance of the surface may be sufficiently evaluated because the conventional colorimeter or gloss meter may only perform evaluation under a certain condition. In order to evaluate the complex reflection characteristics, it is necessary to evaluate a bidirectional reflectance distribution function (BRDF) representing reflection angle characteristics depending on an illumination angle or a light reception angle. By evaluating BRDF, it becomes possible to quantitatively evaluate a difference in appearance depending on how light is applied and an observation direction.

Furthermore, in the evaluation of metallic coating, there is a demand for evaluating distribution of luster materials (such as aluminum flakes) contained in a coating material. Therefore, it is required not only to be able to evaluate the reflection characteristics of a coated surface but also to be able to acquire a two-dimensional image of the coated surface.

A goniophotometer is generally used as a device for measuring BRDF. However, it is necessary to move an illumination unit and a measurement unit of the goniophotometer when measuring BRDF. For this reason, the measurement of BRDF by the goniophotometer has problems that 1) it takes time to perform the measurement, 2) it is to measure discrete illumination angle and light reception angle, and 3) the measuring device is large. A measuring instrument capable of measuring BRDF in a short time having a small size is required. Furthermore, it is also required that a two-dimensional image of a measurement target may be acquired by the measuring instrument.

As an invention corresponding to these requirements, WO 2006/050978 (Patent Literature 1) discloses a reflection angle characteristic device using a relay system Fourier transform optical system. According to this invention, BRDF of the measurement target may be measured in one shot. Furthermore, Example 4 (FIG. 5) of WO 2006/050978 discloses an optical system capable of acquiring a two-dimensional image of a surface of the measurement target.

CITATION LIST

Patent Literature

Patent Literature 1: WO 2006/050978

SUMMARY OF INVENTION

Technical Problem

In the device disclosed in WO 2006/050978, there is a problem that an image of a measurement target acquired by an optical system for acquiring a two-dimensional image deviates from an appearance in a case where a person visually observes the measurement target. According to WO 2006/050978, a lens 3 having positive power and a lens 13 having positive power are arranged so as to interpose an intermediate image position (Fourier plane 9). These lenses 3 and 13 are lenses shared by a BRDF measurement optical system and an optical system for acquiring a two-dimensional image. The intermediate image position corresponds to a focal position of the lens 3.

When an aperture stop is provided at a focal position of the lens 3, a main light beam is parallel to an optical axis on a measurement target side, so that the optical system for acquiring a two-dimensional image is a so-called object side telecentric optical system. However, according to WO 2006/050978, the aperture stop in the optical system for acquiring a two-dimensional image is located at a position far away from the intermediate image position. As a result, the optical system for acquiring a two-dimensional image is not the object side telecentric optical system, so that an observation angle is greatly inclined in a peripheral portion of a measurement area. In contrast, when a person looks at an object, the person looks at light substantially parallel to a line of sight. Therefore, the image captured by the optical system disclosed in WO 2006/050978 deviates from an appearance in a case of visual observation.

The present invention is achieved in view of such a problem, and an object thereof is to provide an optical system for measuring optical characteristics and a device for measuring optical characteristics capable of acquiring a two-dimensional image close to visual observation in addition to measurement of optical characteristics of a measurement target.

Solution to Problem

In order to solve the above-described problem, an optical system for measuring optical characteristics according to an aspect of the present invention is an optical system for measuring optical characteristics for measuring reflected light from a measurement target, the optical system for measuring optical characteristics including a first optical system and a second optical system that measure a common measurement target, the first optical system including, in order from an object side, a first lens group having positive power, a second lens group having positive power, an aperture stop, a first imaging element, and an illumination light source, the first optical system being a relay optical system that forms an intermediate image between the first lens group and the second lens group, the aperture stop being arranged in the second lens group such that an entrance pupil of the aperture stop is on an object side of the first lens group, the measurement target being arranged in the vicinity of the entrance pupil of the aperture stop, and the first imaging element being arranged conjugate with object side infinity, and the second optical system including, in order from an object side, the first lens group shared by the first optical system, a third lens group having positive power, and a second imaging element, the second imaging element being arranged at a position conjugate with the measurement target. When a distance in an optical axis direction from an image side paraxial focal point of the first lens group to the aperture stop is represented by Δp and a focal distance of the first lens group is represented by f1, following conditional expression (1) is satisfied $$-1.0 < \Delta p/f1 < 3.0 \tag{1}$$

The first optical system and the second optical system share the first lens group, the optical system for measuring optical characteristics further includes an optical element that deflects an optical axis to an image side of the first lens group, and the optical axis is branched into two directions by the optical element, the first optical system is arranged in a first direction of the two directions, and the second optical system is arranged in a second direction of the two directions.

The optical system for measuring optical characteristics preferably includes another optical element that deflects an optical axis between the intermediate image by the first lens group and the first imaging element, and a light source capable of causing any minute region on a surface to emit light at another position conjugate with the object side infinity to which the optical axis is deflected by the another optical element.

When an interval between the first lens group and the second lens group is represented by L, and an effective diameter of the largest lens in the first lens group is represented by φ1, following conditional expression (2) is preferably satisfied.

$$0.4 < L/\varphi 1 < 3.0 \tag{2}$$

In the first optical system, preferably, when an angle of a light beam reflected from a center of the measurement target is represented by θ, and a position at which the light beam reaches the imaging element is represented by Y(θ), θ and Y(θ) have a substantially proportional relationship, and when a maximum image height is represented by Ymax and a maximum light beam angle is represented by Amax, following conditional expression (3) is satisfied $$-0.1 < (Y(\theta\ max/2) - Y max/2)/Y max < 0.1 \tag{3}$$

The optical system for measuring optical characteristics preferably further includes a light source arranged around the aperture stop of the second optical system and capable of illuminating the measurement target when the measurement target is imaged by the second optical system.

When a back focus of the first optical system is represented by fB, and an effective diameter of the surface the closest to the image side of the second lens group is represented by φ2, fB/φ2 preferably satisfies following conditional expression (4).

$$1.0 < fB/\varphi 2 < 3.0 \tag{4}$$

In another aspect of the present invention, a device for measuring optical characteristics is provided with the optical system for measuring optical characteristics according to any one of the above, and has a function of measuring the optical characteristics of the measurement target and a function of imaging the measurement target.

Advantageous Effects of Invention

According to the present disclosure, an optical system for measuring optical characteristics and a device for measuring optical characteristics capable of acquiring a two-dimensional image close to visual observation in addition to measurement of optical characteristics of a measurement target may be provided.

DESCRIPTION OF EMBODIMENTS

Figure 1:
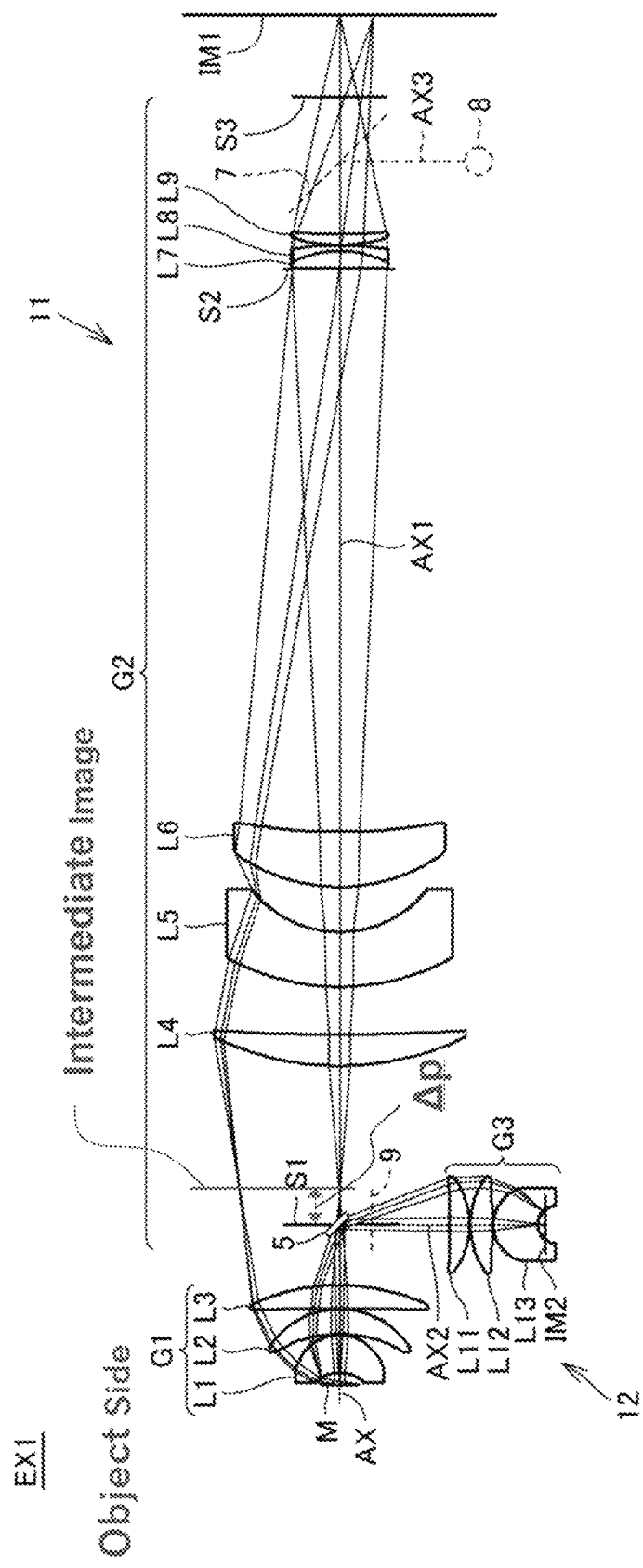
FIG. 1 is a diagram illustrating a configuration of an optical system for measuring optical characteristics according to a first embodiment.

Embodiments of the present invention are hereinafter described with reference to the drawings. An optical system for measuring optical characteristics according to the embodiments of the present invention includes a first optical system that captures an infinite conjugate image and a second optical system that captures a conjugate image of a measurement target. The first optical system and the second optical system sharing a first lens group are arranged on two optical axes separated by an optical element that deflects an optical axis, respectively, and are configured as one measuring optical system.

Furthermore, an aperture stop of the second optical system is arranged in the vicinity of an intermediate image. Specifically, when a distance in an optical axis direction from an image side paraxial focal point of the first lens group to the aperture stop is represented by Δp, and a focal distance of the first lens group is represented by f1, Δp/f1 satisfies a conditional expression mentioned below.

$$-1.0 < \Delta p/f1 < 3.0$$

When the conditional expression mentioned above is satisfied, the aperture stop of the second optical system is arranged in the vicinity of an intermediate image, so that an observation angle of the second optical system may be made close to parallel. Therefore, it becomes possible to acquire a two-dimensional image close to visual observation in addition to measurement of the optical characteristics of the measurement target.

More specifically, an optical system for measuring optical characteristics according to an aspect of the present invention is an optical system for measuring optical characteristics for measuring reflected light from a measurement target, the optical system for measuring optical characteristics including a first optical system and a second optical system that measure a common measurement target, the first optical system including, in order from an object side, a first lens group having positive power, a second lens group having positive power, an aperture stop, a first imaging element, and an illumination light source, the first optical system being a relay optical system that forms an intermediate image between the first lens group and the second lens group, the aperture stop being arranged in the second lens group such that an entrance pupil of the aperture stop is on an object side of the first lens group, the measurement target being arranged in the vicinity of the entrance pupil of the aperture stop, and the first imaging element being arranged conjugate with object side infinity, and the second optical system including, in order from an object side, the first lens group shared by the first optical system, a third lens group having positive power, and a second imaging element, the second imaging element being arranged at a position conjugate with the measurement target.

When the distance in the optical axis direction from the image side paraxial focal point of the first lens group to the aperture stop is represented by $\Delta p$, and the focal distance of the first lens group is represented by f1, a conditional expression mentioned below is satisfied.

$$-1.0 < \Delta p/f1 < 3.0 \quad (1)$$

The first optical system and the second optical system share the first lens group, the optical system for measuring optical characteristics further includes an optical element that deflects an optical axis to an image side of the first lens group, and the optical axis is branched into two directions by the optical element, the first optical system is arranged in a first direction of the two directions, and the second optical system is arranged in a second direction of the two directions.

Since the first optical system has the above-described configuration, the first imaging element is arranged at an infinite conjugate position, and the first optical system becomes an optical system in which coordinates on an imaging surface of the first imaging element are determined according to a light beam angle incident from an object side (that is, a Fourier transform optical system). With this characteristic, angle distribution of reflected light from the measurement target may be formed on the imaging surface of the first imaging element. Furthermore, by arranging the aperture stop so that an entrance pupil is located the closest to the object side and arranging the measurement target in the vicinity of the entrance pupil, it is possible to measure substantially the same position for all the reflection angles.

Since the first lens group forms an image of a very-wide-angle light beam of about 80°, it is difficult to correct various aberrations, especially a field curvature and a distortion aberration that increase with wide angle only by the first lens group. By using a relay optical system as the first optical system, the aberration generated in the first lens group may be corrected by the second lens group, so that excellent aberration performance may be maintained Furthermore, by causing the second optical system to have the above-described configuration, the second imaging element may capture a two-dimensional image of the measurement target. By arranging the aperture stop so as to satisfy conditional expression (1), the aperture stop may be arranged in the vicinity of the intermediate image position and the entrance pupil is separated from the measurement target, so that the second optical system has a configuration close to object-side telecentric. In the object-side telecentric optical system, a main light beam is parallel to the optical axis on a measurement target side. When a person looks at an object, the person looks at light substantially parallel to a line of sight, so that it is possible to acquire a two-dimensional image close to visual observation.

Furthermore, the first optical system and the second optical system share the first lens group, the optical axis is branched into two by the optical element, and the first optical system and the second optical system are arranged in the respective directions, so that two different optical systems may be configured for the same measurement position. As a result, the reflection angle distribution and the two-dimensional image may be acquired simultaneously or continuously, so that the measurement may be performed in a short time.

More desirably, a value $\Delta p/f1$ satisfies following conditional expression (1)'.

$$-0.8 < \Delta p/f1 < 2.0 \quad (1)'$$

Still more desirably, the value $\Delta p/f1$ satisfies following conditional expression (1)".

$$-0.6 < \Delta p/f1 < 1.5 \quad (1)''$$

In the embodiments of the present invention, the optical system for measuring optical characteristics may include another optical element that deflects the optical axis between the intermediate image by the first lens group and the first imaging element, and a light source that may cause any minute region on the surface to emit light at another position conjugate with the object side infinity to which the optical axis is deflected by the another optical element.

Since the optical system closer to the object side than the additional optical element also serves as an illumination optical system, it is not necessary to separately provide an optical system for illumination Therefore, the optical system may be simplified. Furthermore, by including the light source capable of causing any minute region on the surface to emit light at the position conjugate with the object side infinity, it is possible to illuminate the measurement target with parallel light having an angle corresponding to the position to emit light. As a result, since the measurement target may be illuminated at any angle, BRDF may be measured in further detail.

In the embodiments of the present invention, when an interval between the first lens group and the second lens group is represented by L, and an effective diameter of the largest lens in the first lens group is represented by $\varphi 1$, following conditional expression (2) is preferably satisfied.

$$0.4 < L/\varphi 1 < 3.0 \quad (2)$$

When a value of $L/\varphi 1$ becomes larger than a lower limit of conditional expression (2), the interval between the first lens group and the second lens group may be made sufficiently large, so that the optical element that deflects the optical axis and the aperture stop may be easily arranged between the first lens group and the second lens group. In contrast, when the value of $L/\varphi 1$ becomes smaller than an upper limit of conditional expression (2), it is possible to avoid an unnecessary increase in optical entire length, so that it is possible to prevent an increase in size of a measuring device.

More preferably, the value L/ϕ1 satisfies following conditional expression (2)'.

$$0.5 < L/\phi 1 < 2.5 \tag{2}'$$

Still more preferably, the value L/ϕ1 satisfies following conditional expression (2)".

$$0.6 < L/\phi 1 < 2.0 \tag{2}''$$

In the first optical system, when an angle of a light beam reflected from the center of the measurement target is represented by θ, and a position at which the light beam reaches the imaging element is represented by Y(θ), θ and Y(θ) have a substantially proportional relationship, and when a maximum image height is represented by Ymax and a maximum light beam angle is represented by Amax, following conditional expression (3) is preferably satisfied $$-0.1 < (Y(\theta\,\text{max}/2) - Y\,\text{max}/2)/Y\,\text{max} < 0.1 \tag{3}.$$

When θ and Y(θ) satisfy the substantially proportional relationship, and (Y(θ max/2)−Ymax/2)/Ymax satisfies an upper limit and a lower limit of a range determined by conditional expression (3), an image of the angle distribution of reflection from the measurement target is substantially directly formed as illuminance distribution on the imaging element. Therefore, correction calculation for converting the position on the imaging element into the angle of reflection from the measurement target becomes easy.

More preferably, (Y(θ max/2)−Ymax/2)/Ymax satisfies following conditional expression (3)'.

$$-0.08 < (Y(\theta\,\text{max}/2) - Y\,\text{max}/2)/Y\,\text{max} < 0.08 \tag{3}'$$

More preferably, (Y(θ max/2)−Ymax/2)/Ymax satisfies following conditional expression (3)".

$$-0.05 < (Y(\theta\,\text{max}/2) - Y\,\text{max}/2)/Y\,\text{max} < 0.05 \tag{3}''$$

In the embodiments of the present invention, the optical system for measuring optical characteristics may include a light source that is arranged around the aperture stop of the second optical system and may illuminate the measurement target at the time of imaging of the measurement target by the second optical system. As a result, an entire imaging range of the second optical system may be uniformly illuminated, so that the image closer to visual observation may be acquired.

In the embodiments of the present invention, when a back focus of the first optical system is represented by fB, and an effective diameter of the surface the closest to the image side of the second lens group is represented ϕ2, it is preferable that fB/ϕ2 satisfies following conditional expression (4).

$$1.0 < fB/\phi 2 < 3.0 \tag{4}$$

Conditional expression (4) is a condition for arranging the optical element between the intermediate image by the first lens group and the first imaging element and in a back focus portion of the first optical system. When conditional expression (4) is satisfied, an entire first optical system may also be used as the illumination optical system, so that the additional lens is unnecessary. Therefore, the configuration of the optical system may be further simplified.

When fB/ϕ2 becomes larger than a lower limit of conditional expression (4), the back focus becomes long. As a result, it is possible to minimize vignetting of the light beam and to arrange the optical element. In contrast, when fB/ϕ2 becomes smaller than an upper limit of conditional expression (4), it becomes possible to avoid an unnecessary increase in optical entire length, so that it is possible to downsize the measuring device.

More preferably, fB/ϕ2 satisfies following conditional expression (4)'.

$$1.3 < fB/\phi 2 < 2.8 \tag{4}'$$

Still more preferably, fB/ϕ2 satisfies following conditional expression (4)".

$$1.6 < fB/\phi 2 < 2.6 \tag{4}''$$

In the embodiments of the present invention, a device for measuring optical characteristics is preferably provided with the optical system for measuring optical characteristics according to any one of the above, and preferably has a function of measuring the optical characteristics of the measurement target and a function of imaging the measurement target. Therefore, it becomes possible to acquire the two-dimensional image close to visual observation in addition to the measurement of the optical characteristics (reflection characteristics) of the measurement target. It is possible to avoid an increase in size of the device for measuring optical characteristics.

(Configuration of Optical System for Measuring Optical Characteristics)

A configuration of the optical system for measuring optical characteristics according to the embodiments of the present invention is described with reference to FIGS. 1 to 6B. FIGS. 1 to 6B are diagrams illustrating configurations of an optical system for measuring optical characteristics according to first to third embodiments. Note that, in FIGS. 1 to 6B, the first to third embodiments are referred to as "EX1", "EX2", and "EX3", respectively.

First Embodiment

Figure 2A:
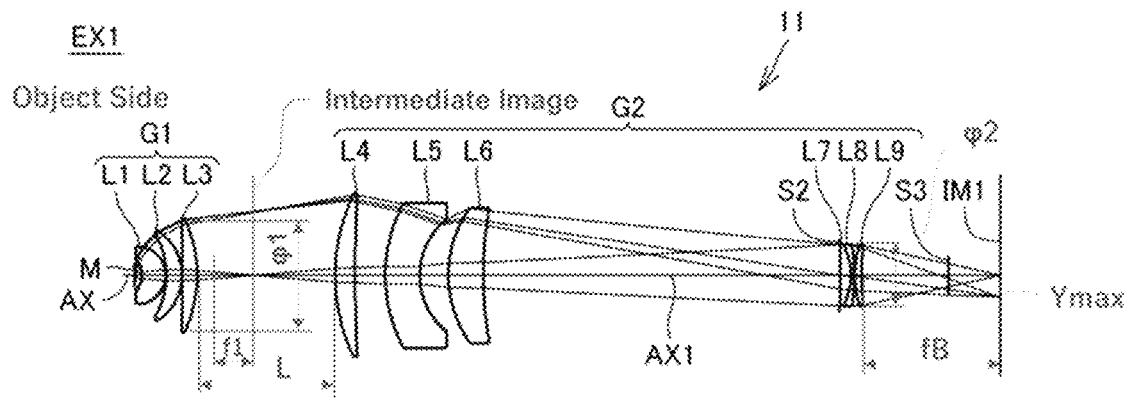
FIG. 2A is a diagram illustrating a first optical system of the optical system for measuring optical characteristics according to the first embodiment.
Figure 2B:
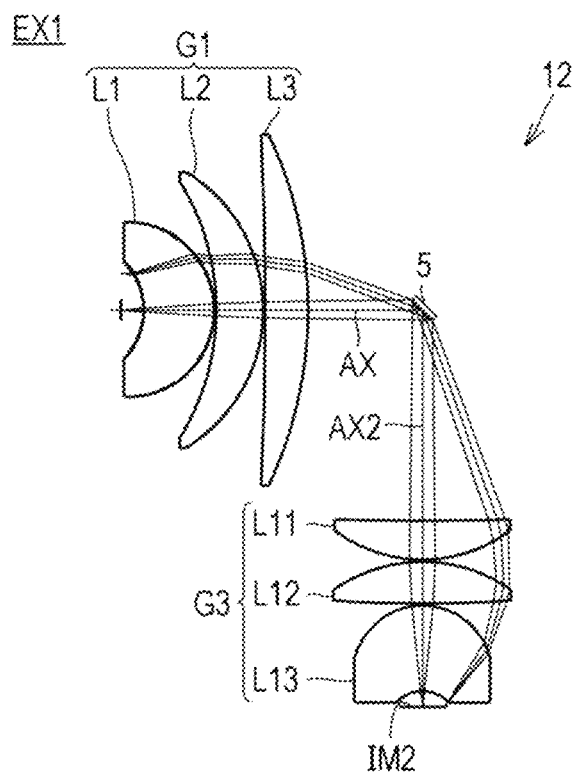
FIG. 2B is a diagram illustrating a second optical system of the optical system for measuring optical characteristics according to the first embodiment.

As illustrated in FIGS. 1 to 2B, an optical system for measuring optical characteristics according to a first embodiment is provided with a first optical system 11 and a second optical system 12 that measure a common measurement target M. FIG. 2A is a diagram illustrating only the first optical system 11, and FIG. 2B is a diagram illustrating only the second optical system 12.

The first optical system 11 includes, in order from an object side, a first lens group G1 having positive power, a second lens group G2 having positive power, an aperture stop S2, a first imaging element (not illustrated), and an illumination light source (not illustrated).

The first lens group G1 includes lenses L1, L2, and L3. The second lens group G2 includes lenses L4, L5, L6, L7, L8, and L9. The first optical system 11 is a relay optical system that forms an intermediate image between the first lens group G1 and the second lens group G2.

The aperture stop S2 is arranged in the second lens group G2. An entrance pupil of the aperture stop S2 is directed toward the object side of the first lens group G1. The measurement target M is arranged in the vicinity of the entrance pupil of the aperture stop S2.

The first imaging element is arranged conjugate with object side infinity. Therefore, the first optical system 11 is an optical system that captures an infinite conjugate image of the measurement target M. In FIG. 1, an image surface IM1 is illustrated in place of the first imaging element (the same applies to the drawings hereinafter described). A shielding stop S3 is provided in front of the first imaging element (image surface IM1).

The second optical system 12 includes, in order from the object side, the first lens group G1, a third lens group G3 having positive power, and a second imaging element (not illustrated). The first lens group G1 is shared by the first optical system 11. The third lens group G3 includes a lens L11, a lens L12, and a lens L13.

The second imaging element is arranged at a position conjugate with the measurement target. Therefore, the second optical system captures a conjugate image of the measurement target M. In FIG. 1, an image surface IM2 is illustrated in place of the second imaging element.

The aperture stop S1 is arranged in the vicinity of an intermediate image position so as to satisfy conditional expression (1). In the first embodiment, the aperture stop S1 is located closer to the object (measurement target M) side than the intermediate image position. As a result, the second optical system 12 has a configuration close to object side telecentric. Therefore, it becomes possible to acquire a two-dimensional image close to visual observation.

The optical system for measuring optical characteristics is further provided with an optical element 5 that deflects an optical axis AX on an image side of the first lens group G1. Specifically, the optical element 5 branches the optical axis AX into an optical axis AX1 and an optical axis AX2. A direction of the optical axis AX1 and a direction of the optical axis AX2 are different from each other. The first optical system 11 is arranged in the direction of the optical axis AX1, and the second optical system 12 is arranged in the direction of the optical axis AX2.

A type of the optical element 5 is not especially limited, and for example, a beam splitter, a half mirror and the like may be applied as the optical element 5. The optical element 5 may be an insertable/removable mirror having a size of an aperture of the aperture stop S1. This mirror is removed at the time of imaging by the first optical system 11 and inserted at the time of imaging by the second optical system 12. Alternatively, the optical element 5 may be a beam splitter including an enhanced reflection film formed into the size of the aperture of the aperture stop S1. Note that, in FIG. 1, the aperture stop S1 and the optical element 5 are illustrated at substantially the same position, but in a case where the optical element 5 is the insertable/removable mirror, the optical element 5 and the aperture stop S1 may be arranged so as not to hinder movement of the optical element 5.

The optical system for measuring optical characteristics may further include an optical element 7 and a light source 8. The optical element 7 deflects the optical axis AX1 between the intermediate image by the first lens group G1 and the first imaging element. In FIG. 1, an optical axis AX3 corresponds to an optical axis obtained by deflecting the optical axis AX1 by the optical element 7. A position of the light source 8 is a position conjugate with the object side infinity on the optical axis AX1 (that is, the optical axis AX3) deflected by the optical element 7. It should be noted that although the optical element 7 and the light source 8 are illustrated in FIG. 1, positions thereof in FIG. 1 are not necessarily correct.

The optical element 7 may be, for example, a beam splitter, a half mirror and the like. The light source 8 is an element capable of causing any minute region on a surface to emit light. Although not especially limited, for example, the light source 8 may be a microdisplay.

The optical system for measuring optical characteristics may further include a light source 9 that is arranged around the aperture stop S1 of the second optical system 12 and illuminates the measurement target at the time of imaging of the measurement target by the second optical system 12. The light source 9 may be, for example, a ring illumination. The light source 9 uniformly illuminates an entire imaging range of the second optical system 12. It should be noted that although the light source 9 is illustrated in FIG. 1, the position of the light source 9 in FIG. 1 is not necessarily correct.

According to the first embodiment, with the above configuration, it becomes possible to acquire a two-dimensional image close to visual observation in addition to the measurement of the optical characteristics of the measurement target.

Second Embodiment

Figure 3:
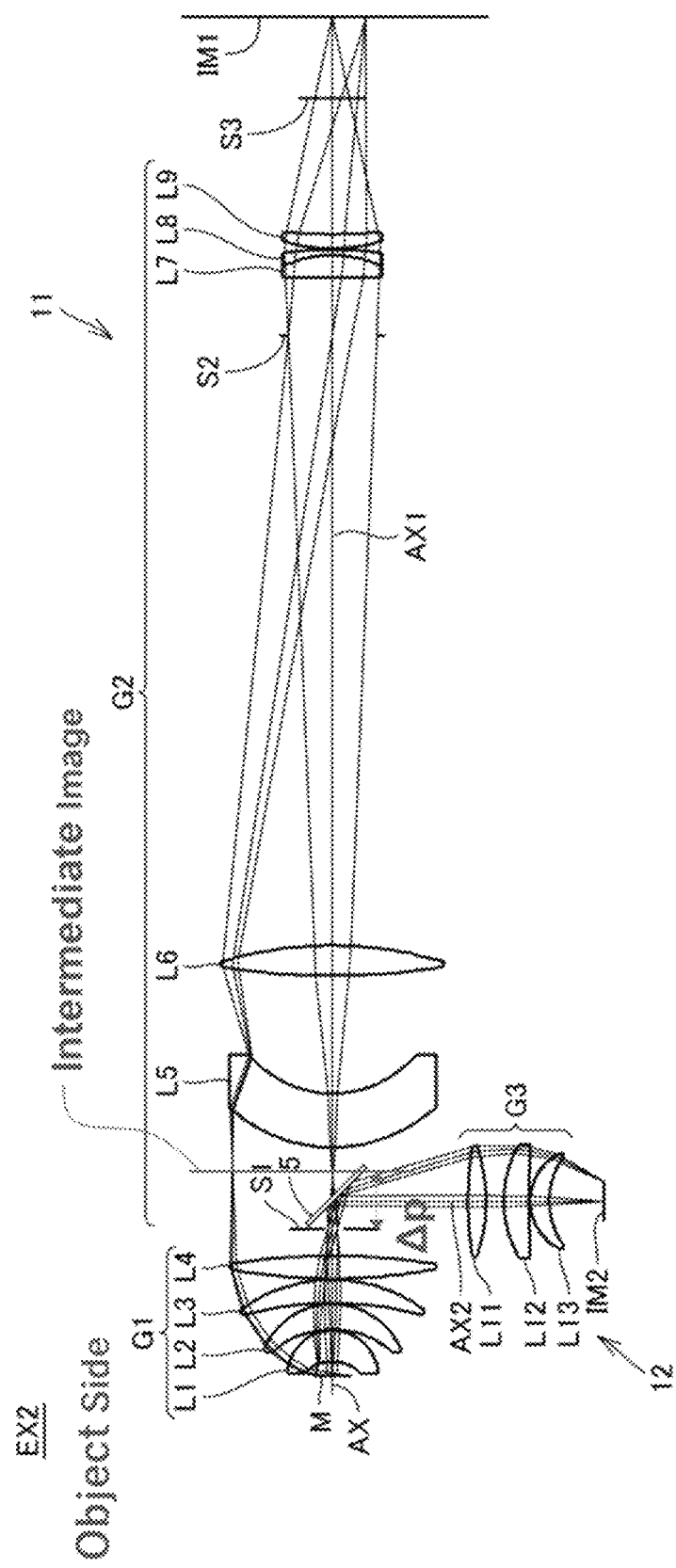
FIG. 3 is a diagram illustrating a configuration of an optical system for measuring optical characteristics according to a second embodiment.
Figure 4A:
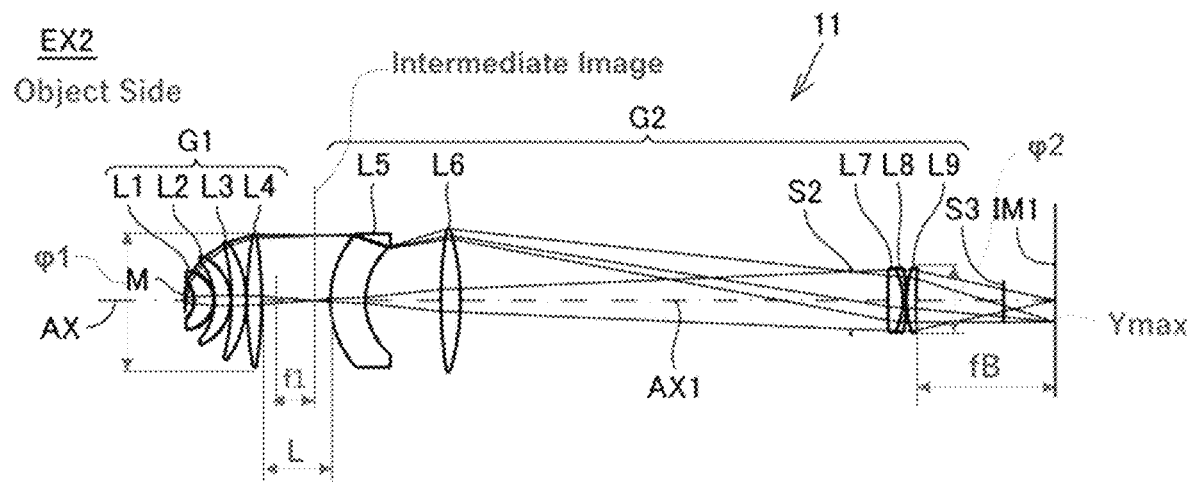
FIG. 4A is a diagram illustrating a first optical system of the optical system for measuring optical characteristics according to the second embodiment.
Figure 4B:
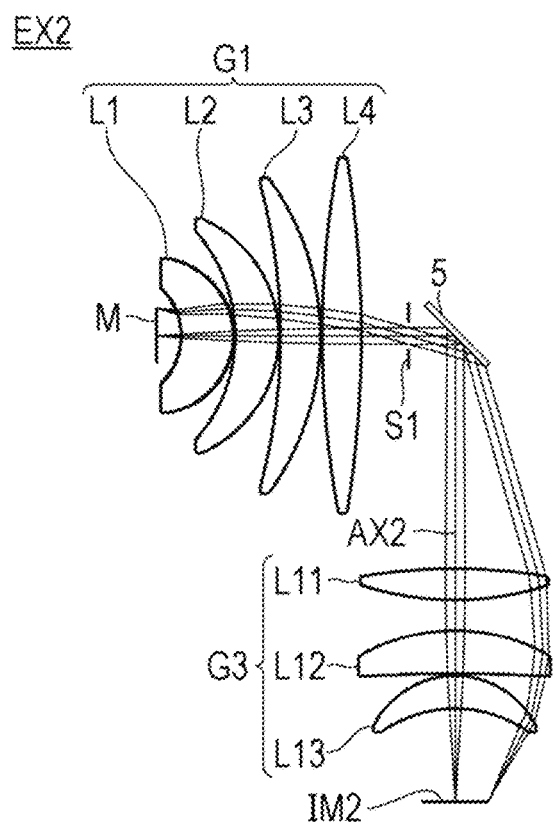
FIG. 4B is a diagram illustrating a second optical system of the optical system for measuring optical characteristics according to the second embodiment.

As illustrated in FIGS. 3 to 4B, an optical system for measuring optical characteristics according to a second embodiment is provided with a first optical system 11 and a second optical system 12 that measure a common measurement target M. FIG. 4A is a diagram illustrating only the first optical system 11, and FIG. 4B is a diagram illustrating only the second optical system 12.

The first optical system 11 includes, in order from an object side, a first lens group G1 having positive power, a second lens group G2 having positive power, an aperture stop S2, a first imaging element (not illustrated), and an illumination light source (not illustrated).

The first lens group G1 includes lenses L1, L2, L3, and L4. The second lens group G2 includes lenses L5, L6, L7, L8, and L9. In this respect, the second embodiment is different from the first embodiment.

The aperture stop S1 is arranged in the vicinity of an intermediate image position so as to satisfy conditional expression (1). In the second embodiment, the aperture stop S1 is located closer to the object (measurement target M) side than the intermediate image position. Note that, the aperture stop S1 is located closer to the object (measurement target M) side than the optical element 5. In this respect, the second embodiment is different from the first embodiment. However, since the aperture stop S1 is arranged so as to satisfy conditional expression (1), the second optical system 12 has a configuration close to object side telecentric as is the case with the first embodiment. Therefore, it becomes possible to acquire a two-dimensional image close to visual observation also in the second embodiment.

In the second embodiment, the aperture stop S1 and the optical element 5 are inserted and removed together. At the time of imaging by the first optical system 11, both the aperture stop S1 and optical element 5 are retracted from an optical path. At the time of imaging by the second optical system 12, both the aperture stop S1 and optical element 5 are inserted. In the second embodiment, a beam splitter or a mirror may be used as the optical element 5.

Other configurations of the optical system for measuring optical characteristics according to the second embodiment are similar to those of the optical system for measuring optical characteristics according to the first embodiment, so that the following description will not be repeated. According to the second embodiment also, it becomes possible to acquire a two-dimensional image close to visual observation in addition to the measurement of the optical characteristics of the measurement target. Note that, although an optical element 7, a light source 8, and a light source 9 are not illustrated in FIG. 3, these elements may also be added in the optical system for measuring optical characteristics according to the second embodiment.

Third Embodiment

Figure 5:
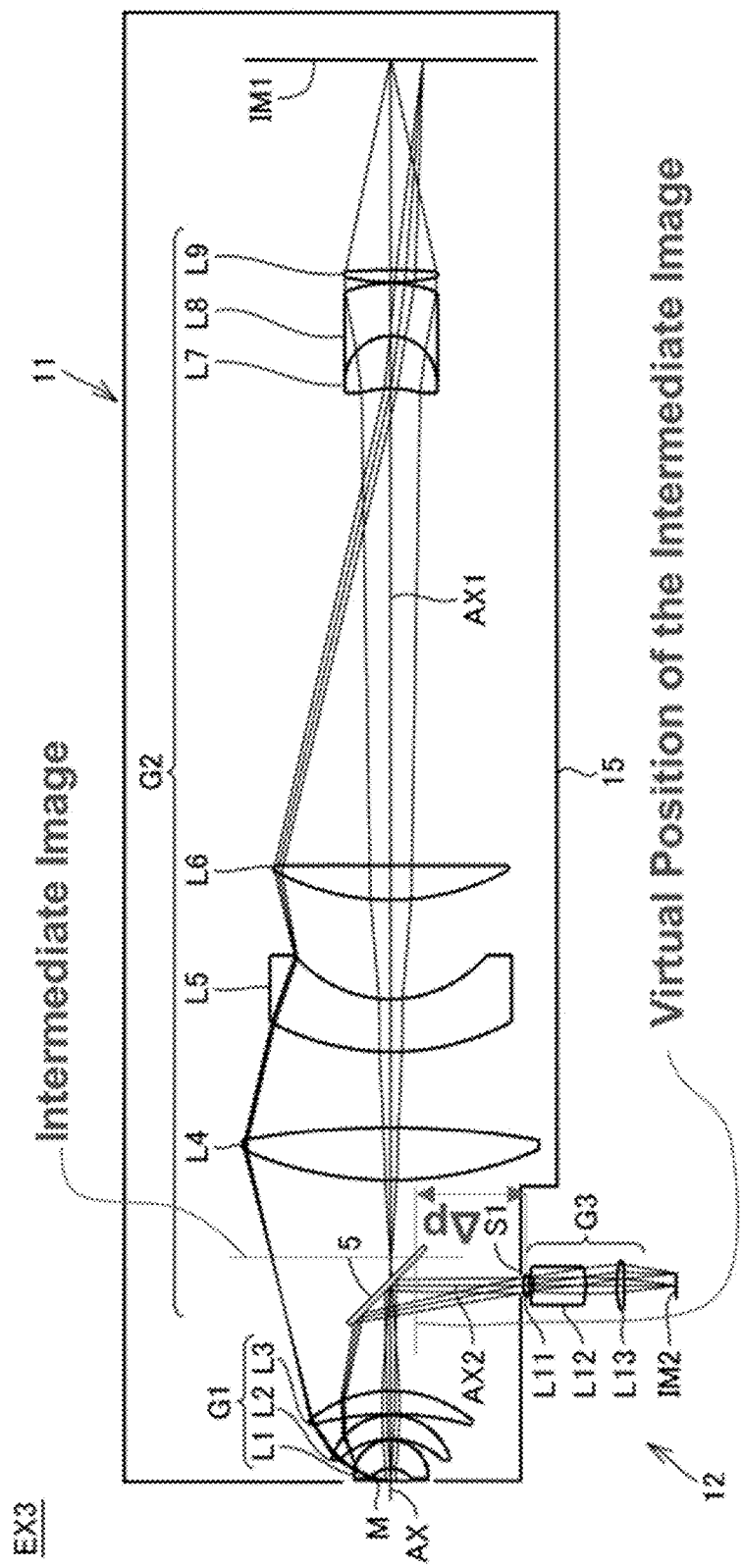
FIG. 5 is a diagram illustrating a configuration of an optical system for measuring optical characteristics according to a third embodiment.
Figure 6A:
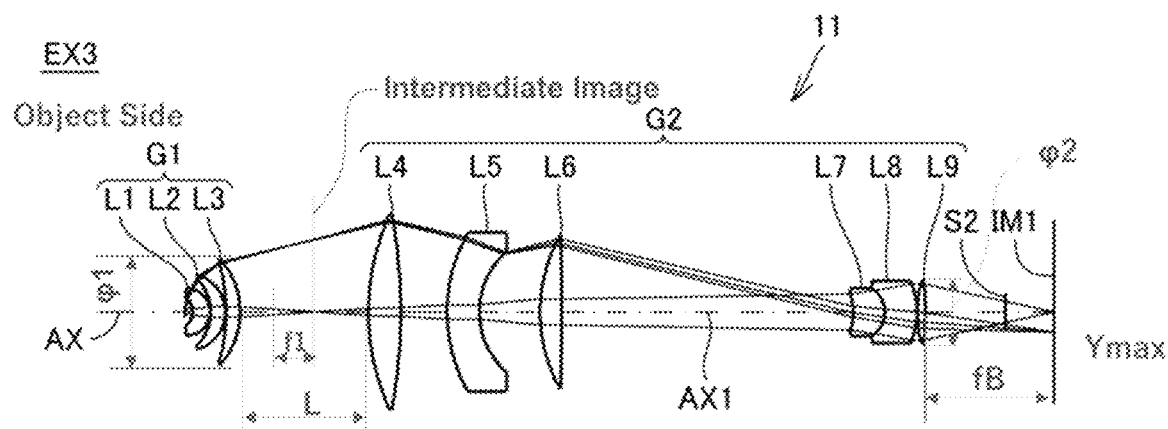
FIG. 6A is a diagram illustrating a first optical system of the optical system for measuring optical characteristics according to the third embodiment.
Figure 6B:
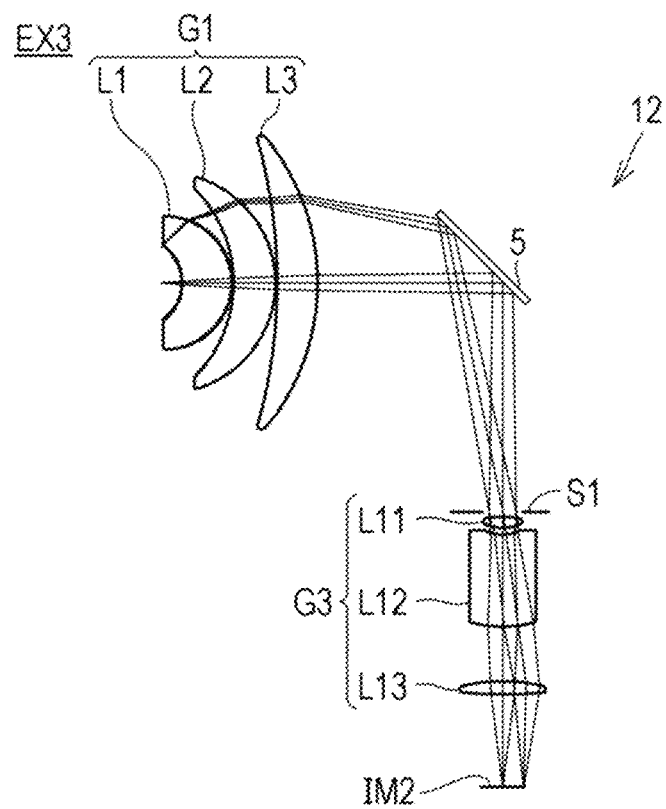
FIG. 6B is a diagram illustrating a second optical system of the optical system for measuring optical characteristics according to the third embodiment.

As illustrated in FIGS. 5 to 6B, an optical system for measuring optical characteristics according to a third embodiment is provided with a first optical system 11 and a second optical system 12 that measure a common measurement target M. FIG. 6A is a diagram illustrating only the first optical system 11, and FIG. 6B is a diagram illustrating only the second optical system 12.

The first optical system 11 includes, in order from an object side, a first lens group G1 having positive power, a second lens group G2 having positive power, an aperture stop S2, a first imaging element (not illustrated), and an illumination light source (not illustrated). The first lens group G1 includes lenses L1, L2, and L3 as in the first embodiment. The second lens group G2 includes lenses L4, L5, L6, L7, L8, and L9.

In the third embodiment, an aperture formed on a housing 15 of the first optical system 11 is used as the aperture stop S1. The aperture stop S1 is arranged in the vicinity of an intermediate image position so as to satisfy conditional expression (1). In the third embodiment, the aperture stop S1 is located closer to an image side than the intermediate image position. The aperture stop S1 is arranged closer to the image side than an optical element 5. Specifically, the aperture stop S1 is arranged on a second optical axis (optical axis AX2). In this respect, the third embodiment is different from the first and second embodiments. However, since the aperture stop S1 is arranged so as to satisfy conditional expression (1), the second optical system 12 has a configuration close to object side telecentric as is the case with the first and second embodiments. Therefore, it becomes possible to acquire a two-dimensional image close to visual observation also in the third embodiment. In the third embodiment, a beam splitter or an insertable/removable mirror may be used as the optical element 5. In a case where the optical element 5 is the insertable/removable mirror, the optical element 5 is retracted from an optical path at the time of imaging of the first optical system 11, and is inserted at the time of imaging of the second optical system 12.

Other configurations of the optical system for measuring optical characteristics according to the third embodiment are similar to those of the optical system for measuring optical characteristics according to the first and second embodiments, so that the following description will not be repeated. According to the third embodiment also, it becomes possible to acquire a two-dimensional image close to visual observation in addition to the measurement of the optical characteristics of the measurement target. Although an optical element 7, a light source 8, and a light source 9 are not illustrated in FIG. 5, these elements may also be added in the optical system for measuring optical characteristics according to the third embodiment.

EXAMPLE

Hereinafter, a configuration and the like of an optical system for measuring optical characteristics according to embodiments of the present invention will be described more specifically with reference to construction data and the like of examples. Examples 1 to 3 (EXs 1 to 3) herein mentioned are numerical value examples corresponding to the first to third embodiments described above, respectively, and lens configuration diagrams (FIGS. 1 to 6B) illustrating the first to third embodiments illustrate optical configurations (lens arrangement, lens shape and the like) of corresponding Examples 1 to 3, respectively.

In the construction data of each example, as surface data, a surface number, a curvature radius (mm), an axial surface interval (mm), a refractive index regarding a d line (wavelength of 587.56 nm), an Abbe number regarding the d line, and an effective radius (mm) are illustrated in this order from a left column. Note that "inf" in a table is an abbreviation of "infinity".

Numerical Value Example 1

<First Optical System>

Lens data and characteristics (various values) of a first optical system are illustrated in Tables 1 and 2. Note that surface numbers in Table 1 are assigned in order from an object side (the same applies to tables described below).

TABLE 1

| Surface number | Curvature radius | Surface interval | Refractive index | Abbe number | Effective radius |
|---|---|---|---|---|---|
| 1 (Measurement target) | inf | 2.194 | | | 2.863 |
| 2 | −6.517 | 6.814 | 1.8467 | 23.78 | 4.610 |
| 3 | −8.251 | 0.200 | | | 8.149 |
| 4 | −22.577 | 4.522 | 1.7995 | 42.22 | 12.092 |
| 5 | −15.16 | 0.200 | | | 12.861 |
| 6 | −334.497 | 4.137 | 1.834 | 37.21 | 16.151 |
| 7 | −38.094 | 40.000 | | | 16.371 |
| 8 | 52.724 | 5.680 | 1.834 | 37.21 | 23.069 |
| 9 | 348.608 | 8.715 | | | 22.919 |
| 10 | 42.136 | 10.000 | 1.788 | 47.37 | 20.368 |
| 11 | 20.459 | 8.237 | | | 16.060 |
| 12 | 32.593 | 10.000 | 1.8467 | 23.78 | 18.897 |
| 13 | 98.88 | 102.751 | | | 18.128 |
| 14 (Aperture stop) | inf | 3.403 | | | 8.596 |
| 15 | 293.946 | 3.203 | 1.7292 | 54.09 | 8.612 |
| 16 | −19.202 | 1.000 | 1.8467 | 23.78 | 8.629 |
| 17 | −53.888 | 0.200 | | | 8.738 |
| 18 | 29.223 | 1.948 | 1.755 | 52.32 | 8.629 |
| 19 | 89.68 | 25.000 | | | 8.463 |
| 20 (Shielding stop) | inf | | | | 5.500 |

TABLE 2

| | Unit | | |
|---|---|---|---|
| f | 4.860 | mm | |
| fB | 40.05 | mm | |
| Fno | 2.41 | | |
| Ymax | 6.18 | mm | |
| θmax | 80.9 | | |
| f1 | 12.658 | mm | Focal distance of first lens group |
| fB1 | 18.140 | mm | Back focus of first lens group |
| L | 40.000 | mm | |
| φ1 | 32.743 | mm | |
| L/φ1 | 1.222 | | Conditional expression (2) |
| Y(θmax/2) | 3.375 | | |
| (Y(θmax/2) − Ymax/2)/Ymax | 0.046 | | Conditional expression (3) |
| fB/φ2 | 2.366 | | Conditional expression (4) |

<Second Optical System>

Lens data and characteristics (various values) of a second optical system are illustrated in Tables 3 and 4.

TABLE 3

| Surface number | Curvature radius | Surface interval | Refractive index | Abbe number | Effective radius |
|---|---|---|---|---|---|
| 1 (Measurement target) | 1E+18 | 2.194 | | | 3.461 |
| 2 | −6.517 | 6.814 | 1.8467 | 23.78 | 3.561 |
| 3 | −8.251 | 0.200 | | | 5.484 |

TABLE 3-continued

| Surface number | Curvature radius | Surface interval | Refractive index | Abbe number | Effective radius |
|---|---|---|---|---|---|
| 4 | −22.577 | 4.522 | 1.7995 | 42.22 | 5.327 |
| 5 | −15.16 | 0.200 | | | 5.556 |
| 6 | −334.497 | 4.137 | 1.834 | 37.21 | 5.276 |
| 7 | −38.094 | 11.000 | | | 4.827 |
| 8 (Aperture stop)* | 1E+18 | 20.000 | | | 0.952 |
| 9 | −331.277 | 3.704 | 1.5163 | 64.14 | 8.412 |
| 10 | −14.244 | 0.200 | | | 8.633 |
| 11 | 14.978 | 3.948 | 1.5163 | 64.14 | 8.655 |
| 12 | −134.19 | 0.200 | | | 8.445 |
| 13 | 6.779 | 8.1067 | 1.5163 | 64.14 | 6.419 |
| 14 | 3.394 | | | | 2.484 |

*Mirror surface

TABLE 4

| | Unit | | |
|---|---|---|---|
| f | −729.300 | mm | |
| fB | 1.54 | mm | |
| 2Y | 4.48 | mm | |
| Fno | 4 | | |
| Δp/f1 | −0.564 | | Conditional expression (1) |

Numerical Value Example 2

<First Optical System>
Lens data and characteristics (various values) of a first optical system are illustrated in Tables 5 and 6.

TABLE 5

| Surface number | Curvature radius | Surface interval | Refractive index | Abbe number | Effective radius |
|---|---|---|---|---|---|
| 1 (Measurement target) | inf | 2.614 | | | 2.718 |
| 2 | −7.282 | 5.655 | 1.8467 | 23.78 | 5.202 |
| 3 | −8.416 | 0.200 | | | 8.162 |
| 4 | −16.951 | 4.653 | 1.7995 | 42.22 | 11.208 |
| 5 | −13.783 | 0.200 | | | 12.411 |
| 6 | −61.743 | 4.252 | 1.834 | 37.21 | 16.217 |
| 7 | −28.714 | 0.200 | | | 16.708 |
| 8 | 104.609 | 4.190 | 1.834 | 37.21 | 18.751 |
| 9 | −119.381 | 19.860 | | | 18.812 |
| 10 | 28.318 | 10.000 | 1.7815 | 47.25 | 18.813 |
| 11 | 20.188 | 21.649 | | | 15.412 |
| 12 | 130.935 | 5.577 | 1.8467 | 23.78 | 20.235 |
| 13 | −70.705 | 112.231 | | | 20.318 |
| 14 (Aperture stop) | inf | 10.680 | | | 8.207 |
| 15 | 317.745 | 4.152 | 1.7292 | 54.09 | 8.844 |
| 16 | −21.008 | 1.000 | 1.8467 | 23.78 | 8.907 |
| 17 | −62.094 | 0.200 | | | 9.046 |
| 18 | 31.571 | 2.687 | 1.755 | 52.32 | 9.023 |
| 19 | 133.574 | 25.000 | | | 8.803 |
| 20 (Shielding stop) | inf | | | | 6.200 |

TABLE 6

| | Unit | |
|---|---|---|
| f | 4.816 | mm |
| fB | 40.05 | mm |
| Fno | 2.41 | |
| Ymax | 6.18 | mm |

TABLE 6-continued

| | Unit | | |
|---|---|---|---|
| θmax | 80.2 | ° | |
| f1 | 12.166 | mm | Focal distance of first lens group |
| fB1 | 14.910 | mm | Back focus of first lens group |
| L | 19.860 | mm | |
| φ1 | 37.625 | mm | |
| L/φ1 | 0.528 | | Conditional expression (2) |
| Y(θmax/2) | 3.332 | | |
| (Y(θmax/2) − Ymax/2)/Ymax | 0.039 | | Conditional expression (3) |
| fB/φ2 | 2.275 | | Conditional expression (4) |

<Second Optical System>
Lens data and characteristics (various values) of a second optical system are illustrated in Tables 7 and 8.

TABLE 7

| Surface number | Curvature radius | Surface interval | Refractive index | Abbe number | Effective radius |
|---|---|---|---|---|---|
| 1 (Measurement target) | inf | 2.614 | | | 2.990 |
| 2 | −7.282 | 5.655 | 1.8467 | 23.78 | 2.802 |
| 3 | −8.416 | 0.200 | | | 3.510 |
| 4 | −16.951 | 4.653 | 1.7995 | 42.22 | 3.417 |
| 5 | −13.783 | 0.200 | | | 3.463 |
| 6 | −61.743 | 4.252 | 1.834 | 37.21 | 3.354 |
| 7 | −28.714 | 0.200 | | | 3.015 |
| 8 | 104.609 | 4.190 | 1.834 | 37.21 | 2.917 |
| 9 | −119.381 | 5.000 | | | 2.321 |
| 10 (Aperture stop) | inf | 5.000 | | | 0.869 |
| 11* | inf | 25.000 | | | 2.319 |
| 12 | 61.579 | 3.342 | 1.5163 | 64.14 | 9.797 |
| 13 | −32.022 | 3.293 | | | 9.921 |
| 14 | 20.180 | 4.666 | 1.5163 | 64.14 | 10.115 |
| 15 | 178.183 | 0.208 | | | 9.727 |
| 16 | 9.724 | 3.515 | 1.5163 | 64.14 | 8.529 |
| 17 | 13.676 | | | | 7.914 |

TABLE 8

| | Unit | | |
|---|---|---|---|
| f | −23.258 | mm | |
| fB | 10.13 | mm | |
| 2Y | 7.2 | mm | |
| Fno | 8 | | |
| Δp/f1 | −0.815 | | Conditional expression (1) |

Numerical Value Example 3

<First Optical System>
Lens data and characteristics (various values) of a first optical system are illustrated in Tables 9 and 10.

TABLE 9

| Surface number | Curvature radius | Surface interval | Refractive index | Abbe number | Effective radius |
|---|---|---|---|---|---|
| 1 (Measurement target) | inf | 2.559 | | | 1.652 |
| 2 | −5.075 | 5.384 | 1.8467 | 23.78 | 4.074 |
| 3 | −7.259 | 0.200 | | | 7.175 |
| 4 | −14.509 | 4.535 | 1.7995 | 42.22 | 10.252 |
| 5 | −12.050 | 0.200 | | | 11.316 |
| 6 | −57.464 | 4.386 | 1.834 | 37.21 | 15.349 |

TABLE 9-continued

| Surface number | Curvature radius | Surface interval | Refractive index | Abbe number | Effective radius |
|---|---|---|---|---|---|
| 7 | −24.879 | 40.000 | | | 15.752 |
| 8 | 72.754 | 10.000 | 1.7729 | 49.6 | 28.548 |
| 9 | −169.608 | 14.427 | | | 28.458 |
| 10 | 50.168 | 10.000 | 1.8216 | 39.07 | 23.212 |
| 11 | 24.704 | 18.833 | | | 18.635 |
| 12 | 48.264 | 6.568 | 1.8467 | 23.78 | 22.623 |
| 13 | −2727.390 | 89.588 | | | 22.500 |
| 14 (Aperture stop) | inf | 1.000 | | | 5.670 |
| 15 | −20.861 | 10.000 | 1.7292 | 54.09 | 5.674 |
| 16 | −8.890 | 10.000 | 1.8467 | 23.78 | 6.675 |
| 17 | −23.838 | 0.200 | | | 8.772 |
| 18 | 40.850 | 2.320 | 1.755 | 52.32 | 8.828 |
| 19 | −116.183 | 25.000 | | | 9.000 |
| 20 (Shielding stop) | inf | | | | 5.800 |

TABLE 10

| | Unit | | |
|---|---|---|---|
| f | 4.794 | mm | |
| fB | 40.04 | mm | |
| Fno | 2.39 | | |
| Ymax | 6.18 | mm | |
| θmax | 80.5 | ° | |
| f1 | 15.016 | mm | Focal distance of first lens group |
| fB1 | 24.625 | mm | Back focus of first lens group |
| L | 40.000 | mm | |
| φ1 | 31.505 | mm | |
| L/φ1 | 1.270 | | Conditional expression (2) |
| Y(θmax/2) | 3.310 | | |
| (Y(θmax/2) − Ymax/2)/Ymax | 0.036 | | Conditional expression (3) |
| fB/φ2 | 2.224 | | Conditional expression (4) |

<Second Optical System>

Lens data and characteristics (various values) of a second optical system are illustrated in Tables 11 and 12.

TABLE 11

| Surface number | Curvature radius | Surface interval | Refractive index | Abbe number | Effective radius |
|---|---|---|---|---|---|
| 1 (Measurement target) | 1.00E+18 | 2.359 | | | 3.966 |
| 2 | −5.075 | 5.384 | 1.8467 | 23.78 | 4.139 |
| 3 | −7.259 | 0.200 | | | 6.855 |
| 4 | −14.509 | 4.535 | 1.7995 | 42.22 | 7.826 |
| 5 | −12.050 | 0.200 | | | 9.092 |
| 6 | −57.464 | 4.386 | 1.834 | 37.21 | 9.254 |
| 7 | −24.879 | 20.000 | | | 9.571 |
| 8 | inf | 25.000 | 1.834 | 37.21 | 5.783 |
| 9 (Aperture stop) | inf | 0.522 | | | 1.463 |
| 10 | 10.51828 | 1.200 | 1.4952 | 69.05 | 1.605 |
| 11 | −4.744448 | 0.773 | | | 1.676 |
| 12 | −4.085 | 10.000 | 1.5163 | 64.14 | 1.640 |
| 13 | −13.247 | 5.947 | | | 3.336 |
| 14 | 17.654 | 1.424 | 1.5163 | 64.14 | 4.000 |
| 15 | −57.149 | | | | 3.955 |

TABLE 12

| | Unit | |
|---|---|---|
| f | −8.181 | mm |
| fB | 10.04 | mm |
| 2Y | 4.48 | mm |
| Fno | 4 | |
| Δp/f1 | 1.357 | Conditional expression (1) |

(Configuration of Device for Measuring Optical Characteristics)

Figure 7:
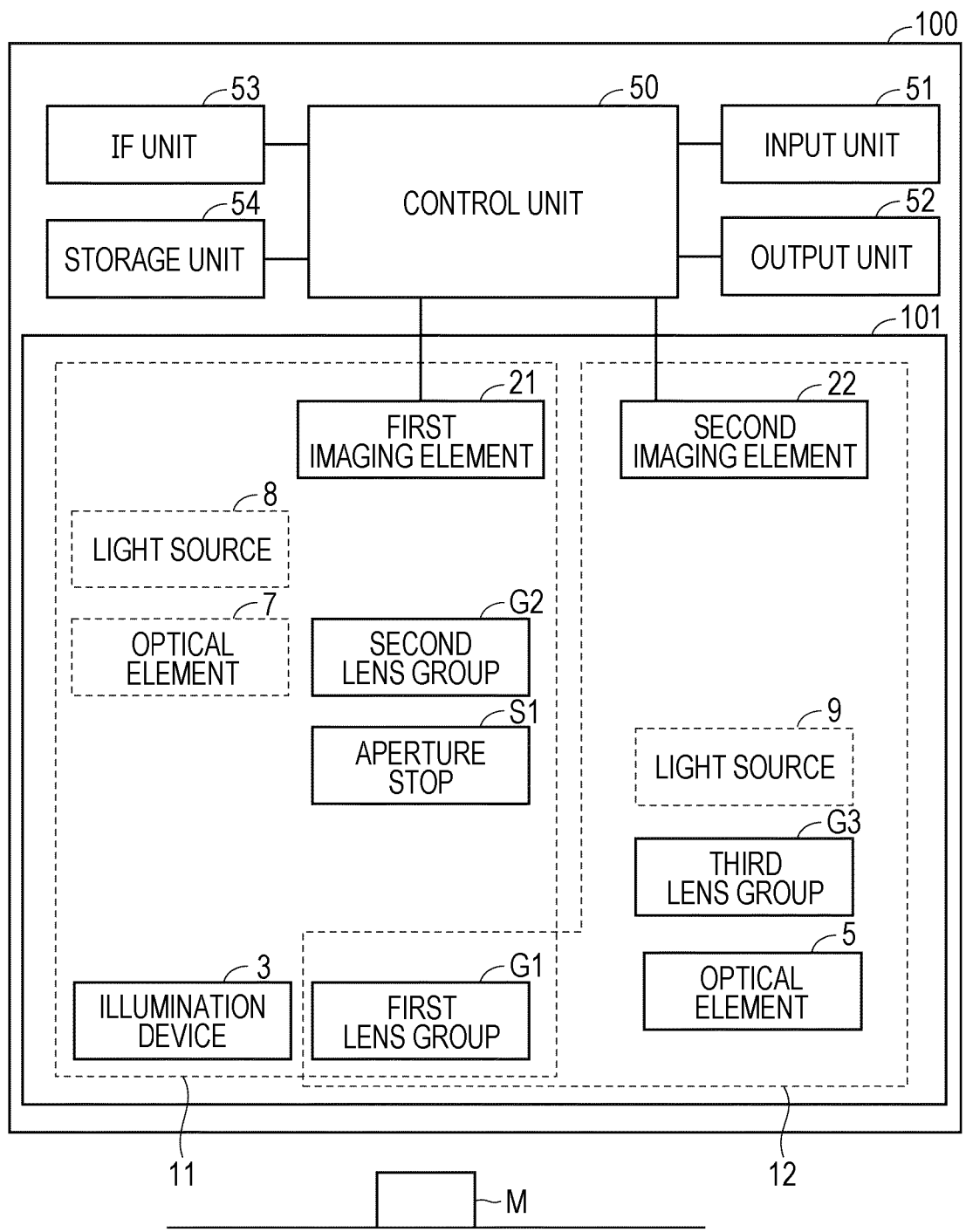
FIG. 7 is a schematic configuration diagram of a device for measuring optical characteristics provided with the optical system for measuring optical characteristics according to the embodiments of the present invention.
Figure 8:
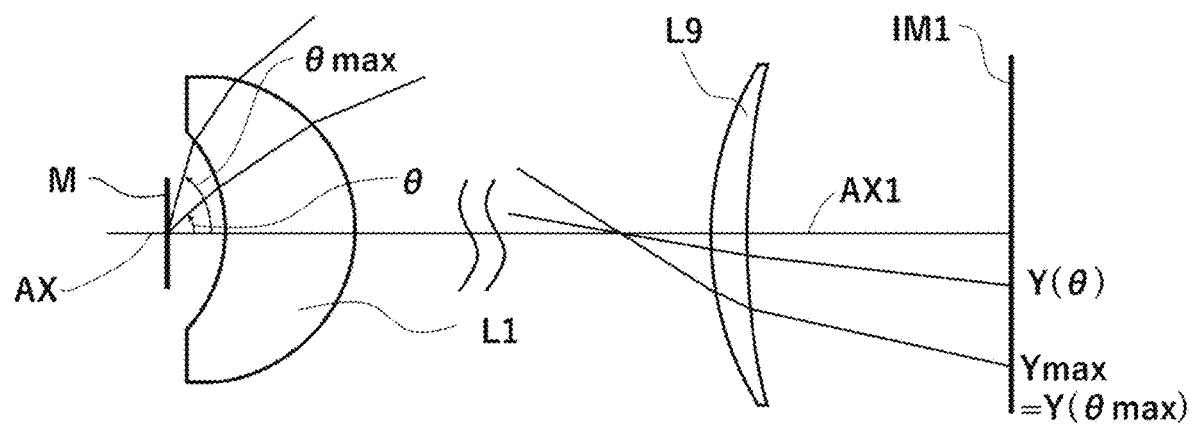
FIG. 8 is a diagram illustrating a first optical system of the optical system for measuring optical characteristics according to the first embodiment, which shows an angle θ of a light beam reflected from a center of the measurement target, a position Y(θ) at which the light beam reaches the imaging element, a maximum image height Ymax, and a maximum light beam angle θ max.

FIG. 7 is a schematic configuration diagram of a device for measuring optical characteristics provided with an optical system for measuring optical characteristics according to the embodiments of the present invention. As illustrated in FIG. 7, a device for measuring optical characteristics 100 is provided with an optical system for measuring optical characteristics 101. The optical system for measuring optical characteristics 101 includes a first optical system 11 and a second optical system 12. The optical system for measuring optical characteristics 101 may have the configuration of the optical system according to any one of the first to third embodiments.

The first optical system 11 includes an illumination device 3, a first lens group G1, an aperture stop S1, a second lens group G2, and a first imaging element 21. The illumination device 3 is a device for illuminating a measurement target M. The first optical system 11 may further include an optical element 7 and a light source 8 illustrated in FIG. 1.

The second optical system 12 includes the first lens group G1, a third lens group G3, an optical element 5, and a second imaging element 22. The first lens group G1 is shared by the first optical system 11 and the second optical system 12. Note that, the second optical system 12 may include a light source 9 illustrated in FIG. 1.

The device for measuring optical characteristics 100 further includes a control unit 50, an input unit 51, an output unit 52, an interface (IF) unit 53, and a storage unit 54. The control unit 50 controls the device for measuring optical characteristics 100. For example, the control unit 50 processes an image signal from the first imaging element 21. As a result, the control unit 50 obtains BRDF. The control unit 50 further processes an image signal from the second imaging element 22 to generate image data of the measurement target M.

The input unit 51 is connected to the control unit 50. For example, the input unit 51 is a device that inputs various commands such as a command for instructing the measurement target M and various pieces of setting information necessary for measuring the optical characteristics to the device for measuring optical characteristics 100.

The output unit 52 is connected to the control unit 50. The output unit 52 is controlled by the control unit 50 and outputs a command and data input by the input unit 51. The output unit 52 further outputs optical characteristics (reflection characteristics) of the measurement target M measured by the device for measuring optical characteristics 100.

For example, the output unit 52 may be a display or a printer. In a case where the output unit 52 is the display, the output unit 52 displays an image of the measurement target M captured by the device for measuring optical characteristics 100 in addition to the optical characteristics of the measurement target M. The input unit 51 and the output unit 52 may be implemented by a touch panel.

The IF unit 53 is connected to the control unit 50. The IF unit 53 is a circuit that is controlled by the control unit 50 and inputs/outputs data to/from an external device. A data communication standard is not limited to a specific standard The storage unit 54 is connected to the control unit 50. The storage unit 54 is controlled by the control unit 50 and stores various predetermined programs and various predetermined data. The programs stored in the storage unit 54 may include, for example, a control program for controlling each unit of the device for measuring optical characteristics 100, an arithmetic program for calculating the reflection characteristics (BRDF) and the like. The storage unit 54 further stores, for example, image data of the measurement target M acquired by the first imaging element 21 and image data of the measurement target M acquired by the second imaging element 22.

The above-described embodiments may be variously modified. Hereinafter, variations included in the embodiments of the present invention are described.

(1) In the device for measuring optical characteristics 100 according to the embodiments of the present invention, BRDF may be measured for each wavelength.

Therefore, it is preferable that the illumination device 3 (light source) included in the first optical system 11 may emit light with a plurality of different spectra. Alternatively, it is also possible that the first imaging element 21 of the first optical system 11 may separately receive a plurality of different spectra. The first imaging element 21 may be, for example, an RGB sensor. In front of the first imaging element 21, filters having a plurality of different bandpass characteristics may be interchangeably arranged.

(2) In the device for measuring optical characteristics 100 according to the embodiments of the present invention, a configuration for increasing an amount of illumination light and an amount of received light may be employed.

For example, a surface light source may be employed as the illumination device 3 of the first optical system 11, and a microlens array may be arranged on an object side of the surface light source. For example, a microdisplay may be used as a light source for the illumination device 3. However, since the microdisplay has a wide light distribution characteristic, only a part of a light emission amount of the microdisplay may be used as illumination light. By combining the microlens array with the microdisplay, the light may have directivity, so that utilization efficiency of light emitted from the microdisplay may be increased.

Alternatively, the optical element 5 that branches the optical axes of the first optical system 11 and the second optical system 12 may be a mirror arranged so as to be insertable and removable on the optical axis. Assuming that the optical element 5 that branches the optical axis is, for example, a half mirror having a reflectance of 50%, the amount of illumination light is halved by the half mirror. When the reflected light passes through the half mirror, the amount of light is further halved. As a result, the amount of received light becomes ¼ or smaller of the amount of illumination light. Therefore, the optical element 5 may be a mirror insertable to and removable from the optical axis as described above. The mirror is removed when BRDF is measured by the first optical system 11, and the mirror is inserted when the image is captured by the second optical system 12. As a result, a loss of the light amount as described above may be substantially eliminated, so that the amount of illumination light and the amount of received light may be increased.

(3) In the device for measuring optical characteristics 100 according to the embodiments of the present invention, a configuration for further shortening measurement time may be employed.

For example, the illumination device 3 may be configured to simultaneously emit light from light emitting positions corresponding to a plurality of angles. The illumination device 3 may be a surface emitting element configured to cause any plurality of regions on a light emitting surface to simultaneously emit light.

As glossiness of the measurement target increases, diffusibility of the reflected light decreases. However, by causing the light emitting positions of the illumination device 3 corresponding to a plurality of angles to simultaneously emit light, reflection characteristics at a plurality of angles may be simultaneously measured. As a result, the measurement time may be shortened.

(4) In the device for measuring optical characteristics 100 according to the embodiments of the present invention, a configuration for performing measurement supporting various industrial standards may be employed.

For example, the illumination device 3 may be configured to be able to cause all the positions corresponding to an illumination angle of 45° of all azimuthal angles to emit light. In this case, the illumination device 3 performs annular illumination of 45°. By measuring an amount of reflected light in a 0° direction at that time, the same measurement as colorimetry of 45° c.:0° geometry defined in the standard such as MS may be performed.

Although the embodiments and examples of the present inventions are described, the embodiments disclosed above should be considered illustrative in all points and not restrictive. The scope of the present invention is indicated by the scope of claims, and it is intended that equivalents of the scope of claims and all modifications within the scope are included.

REFERENCE SIGNS LIST

3 Illumination device
5, 7 Optical element
8, 9 Light source
11 First optical system
12 Second optical system
15 Housing
21 First imaging element
22 Second imaging element
50 Control unit
51 Input unit
52 Output unit
53 IF unit
54 Storage unit
100 Device for measuring optical characteristics
101 Optical system for measuring optical characteristics
AX, AX1, AX2, AX3 Optical axis
G1 First lens group
G2 Second lens group
G3 Third lens group
IM1 Image surface
L1 to L9, L11, L12 Lens
M Measurement target

The invention claimed is:
1. An optical system for measuring optical characteristics for measuring reflected light from a measurement target, the optical system for measuring optical characteristics comprising:

a first optical system and a second optical system that measure a common measurement target, the first optical system including, in order from an object side:

a first lens group having positive power;

a second lens group having positive power; and a first imaging element, the first optical system having an illumination light source, the first optical system being a relay optical system that forms an intermediate image between the first lens group and the second lens group, the first imaging element being arranged conjugate with object side infinity, and the second optical system including, in order from the object side, the first lens group shared by the first optical system;

an aperture stop;

a third lens group having positive power; and a second imaging element, the second imaging element being arranged at a position conjugate with the measurement target, wherein when a distance in an optical axis direction from an image side paraxial focal point of the first lens group to the aperture stop is represented by $\Delta p$ and a focal distance of the first lens group is represented by f1, following conditional expression (1) is satisfied $$-1.0 < \Delta p/f1 < 3.0 \quad (1),$$

the first optical system and the second optical system share the first lens group, the optical system for measuring optical characteristics further includes an optical element that deflects an optical axis to an image side of the first lens group, and the optical axis is branched into two directions by the optical element, the first optical system is arranged in a first direction of the two directions, and the second optical system is arranged in a second direction of the two directions.

2. The optical system for measuring optical characteristics according to claim 1, comprising:

another optical element that deflects an optical axis between the intermediate image by the first lens group and the first imaging element; and a light source capable of causing any minute region on a surface to emit light at another position conjugate with the object side infinity to which the optical axis is deflected by the another optical element.

3. The optical system for measuring optical characteristics according to claim 2, wherein when a back focus of the first optical system is represented by fB, and an effective diameter of a surface closest to an image side of the second lens group is represented $\varphi 2$, following conditional expression (4) is satisfied $$1.0 < fB/\varphi 2 < 3.0 \quad (4).$$

4. The optical system for measuring optical characteristics according to claim 2, wherein when an interval between the first lens group and the second lens group is represented by L, and an effective diameter of a largest lens in the first lens group is represented by $\varphi 1$, following conditional expression (2) is satisfied $$0.4 < L/\varphi 1 < 3.0 \quad (2).$$

5. The optical system for measuring optical characteristics according to claim 2, wherein in the first optical system, when an angle of a light beam reflected from a center of the measurement target is represented by $\theta$, and a position at which the light beam reaches the imaging element is represented by $Y(\theta)$, $\theta$ and $Y(\theta)$ have a substantially proportional relationship, and when a maximum image height is represented by Ymax and a maximum light beam angle is represented by $\theta$ max, following conditional expression (3) is satisfied $$-0.1 < (Y(\theta \max/2) - Y\max/2)/Y\max < 0.1 \quad (3).$$

6. The optical system for measuring optical characteristics according to claim 2, further comprising:

a light source arranged around the aperture stop arranged in the second optical system and capable of illuminating the measurement target when the measurement target is imaged by the second optical system.

7. A device for measuring optical characteristics comprising:

the optical system for measuring optical characteristics according to claim 2, the device for measuring optical characteristics having a function of measuring optical characteristics of the measurement target and a function of imaging the measurement target.

8. The optical system for measuring optical characteristics according to claim 1, wherein when an interval between the first lens group and the second lens group is represented by L, and an effective diameter of a largest lens in the first lens group is represented by $\varphi 1$, following conditional expression (2) is satisfied $$0.4 < L/\varphi 1 < 3.0 \quad (2).$$

9. The optical system for measuring optical characteristics according to claim 8, wherein in the first optical system, when an angle of a light beam reflected from a center of the measurement target is represented by $\theta$, and a position at which the light beam reaches the imaging element is represented by $Y(\theta)$, $\theta$ and $Y(\theta)$ have a substantially proportional relationship, and when a maximum image height is represented by Ymax and a maximum light beam angle is represented by $\theta$ max, following conditional expression (3) is satisfied $$-0.1 < (Y(\theta \max/2) - Y\max/2)/Y\max < 0.1 \quad (3).$$

10. The optical system for measuring optical characteristics according to claim 8, further comprising:

a light source arranged around the aperture stop arranged in the second optical system and capable of illuminating the measurement target when the measurement target is imaged by the second optical system.

11. The optical system for measuring optical characteristics according to claim 8, wherein when a back focus of the first optical system is represented by fB, and an effective diameter of a surface closest to an image side of the second lens group is represented $\varphi 2$, following conditional expression (4) is satisfied $$1.0 < fB/\varphi 2 < 3.0 \quad (4).$$

12. A device for measuring optical characteristics comprising:
the optical system for measuring optical characteristics according to claim 8,
the device for measuring optical characteristics having a function of measuring optical characteristics of the measurement target and a function of imaging the measurement target.

13. The optical system for measuring optical characteristics according to claim 1, wherein
in the first optical system, when an angle of a light beam reflected from a center of the measurement target is represented by θ, and a position at which the light beam reaches the imaging element is represented by Y(θ), θ and Y(θ) have a substantially proportional relationship, and
when a maximum image height is represented by Ymax and a maximum light beam angle is represented by θ max, following conditional expression (3) is satisfied $$-0.1 < (Y(\theta \max/2) - Y\max/2)/Y\max < 0.1 \quad (3).$$

14. The optical system for measuring optical characteristics according to claim 13, further comprising:
a light source arranged around the aperture stop arranged in the second optical system and capable of illuminating the measurement target when the measurement target is imaged by the second optical system.

15. The optical system for measuring optical characteristics according to claim 13, wherein
when a back focus of the first optical system is represented by fB, and an effective diameter of a surface closest to an image side of the second lens group is represented φ2, following conditional expression (4) is satisfied $$1.0 < fB/\varphi 2 < 3.0 \quad (4).$$

16. A device for measuring optical characteristics comprising:
the optical system for measuring optical characteristics according to claim 13,
the device for measuring optical characteristics having a function of measuring optical characteristics of the measurement target and a function of imaging the measurement target.

17. The optical system for measuring optical characteristics according to claim 1, further comprising:
a light source arranged around the aperture stop arranged in the second optical system and capable of illuminating the measurement target when the measurement target is imaged by the second optical system.

18. The optical system for measuring optical characteristics according to claim 17, wherein
when a back focus of the first optical system is represented by fB, and an effective diameter of a surface closest to an image side of the second lens group is represented φ2, following conditional expression (4) is satisfied $$1.0 < fB/\varphi 2 < 3.0 \quad (4).$$

19. A device for measuring optical characteristics comprising:
the optical system for measuring optical characteristics according to claim 17,
the device for measuring optical characteristics having a function of measuring optical characteristics of the measurement target and a function of imaging the measurement target.

20. A device for measuring optical characteristics comprising:
the optical system for measuring optical characteristics according to claim 1,
the device for measuring optical characteristics having a function of measuring optical characteristics of the measurement target and a function of imaging the measurement target.

* * * * *